United States Patent
Monereau et al.

(10) Patent No.: US 7,648,562 B2
(45) Date of Patent: Jan. 19, 2010

(54) PROCESS FOR SEPARATING GAS IN A PSA UNIT WITH TWO COMPRESSORS

(75) Inventors: Christian Monereau, Paris (FR); François Fuentes, Le Vesinet (FR); Philippe Merino, Paris (FR)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 585 days.

(21) Appl. No.: 11/501,134

(22) Filed: Aug. 8, 2006

(65) Prior Publication Data
US 2007/0039467 A1    Feb. 22, 2007

(30) Foreign Application Priority Data
Aug. 8, 2005  (FR)  .................... 05 52456

(51) Int. Cl.
*B01D 53/02*  (2006.01)
(52) U.S. Cl. ................ 95/96; 95/143; 95/148; 96/130
(58) Field of Classification Search .......... 95/96, 95/143, 148; 96/130
See application file for complete search history.

(56) References Cited

U.S. PATENT DOCUMENTS

| | | | |
|---|---|---|---|
| 4,402,712 A | 9/1983 | Benkmann | |
| 5,254,154 A | 10/1993 | Gauthier et al. | |
| 5,656,068 A * | 8/1997 | Smolarek et al. | .............. 95/101 |
| 6,315,818 B1 | 11/2001 | Monereau | |
| 7,396,387 B2 * | 7/2008 | Baksh et al. | ................... 95/96 |
| 2006/0156921 A1 | 7/2006 | Monereau et al. | |

FOREIGN PATENT DOCUMENTS

| | | |
|---|---|---|
| EP | 1 023 934 | 8/2000 |
| FR | 2 682 611 | 4/1993 |
| FR | 2 836 062 | 8/2003 |
| FR | 2 857 884 | 1/2005 |

OTHER PUBLICATIONS

French Search Report for FR 0552456, May 2006.

* cited by examiner

*Primary Examiner*—Robert A Hopkins
(74) *Attorney, Agent, or Firm*—Young & Thompson

(57) ABSTRACT

In a PSA separation method with compression ($C_1$, $C_2$) of at least one offgas (3), in case of temporary shutdown of one of the compressors ($C_1$, $C_2$), the operating parameters of the PSA unit (S) are changed to increase the outlet pressure of the offgas (3), in order to maintain a production level above 50% with a single compressor ($C_1$).

10 Claims, 1 Drawing Sheet

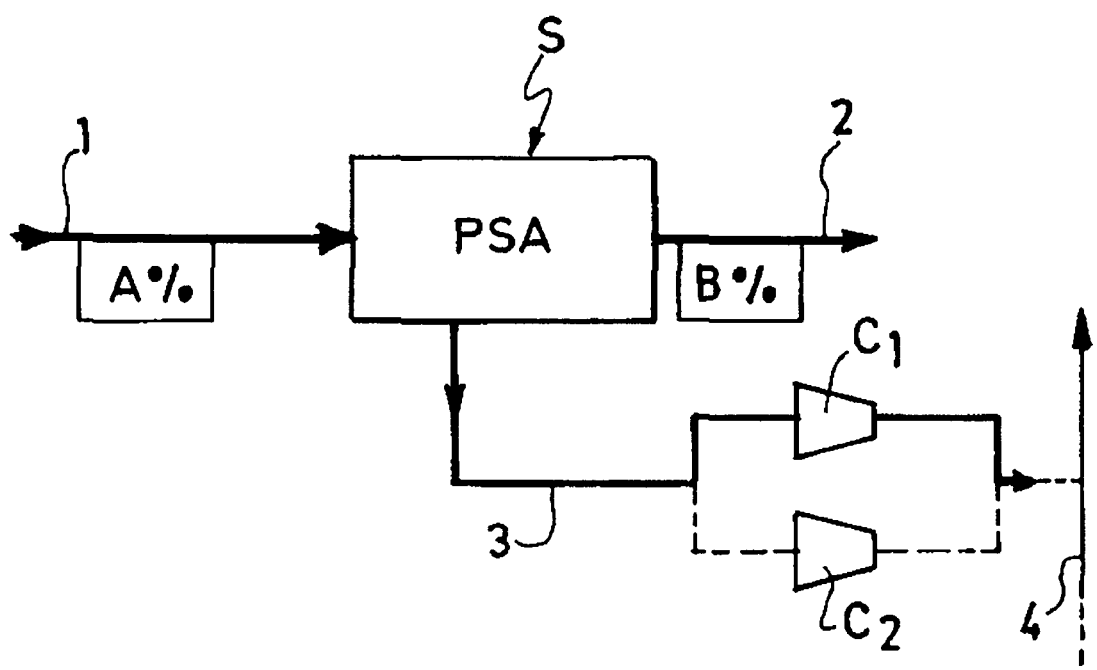

PROCESS FOR SEPARATING GAS IN A PSA UNIT WITH TWO COMPRESSORS

CROSS REFERENCE TO RELATED APPLICATION

This application claims the benefit of priority under 35 U.S.C. § 119(a) and (b) to French Application No. 0552456, filed Aug. 8, 2005, the entire contents of which are incorporated herein by reference.

BACKGROUND

The present invention relates to methods for separating at least one feed gas mixture in a PSA-type adsorption unit.

Adsorption separation processes with pressure swing or PSA processes are widely used for the production of at least one component of the feed gas mixture, for example, the production of oxygen from air, the extraction of $CO_2$ from flue gases, or the production of hydrogen or the separation of synthesis gas.

In the description that follows, the production of hydrogen will be taken as a particular, non-limiting example.

PSA units producing hydrogen, or PSA $H_2$ units, operate in cycles comprising one or more balancing stops, in order, in the latter case, to recycle the maximum possible amount of hydrogen and to increase the recovery thereof, and with an extraction of the offgas at the lowest possible pressure, thereby favouring both investment and performance. Such an $H_2$ PSA cycle is, for example, described in document EP-A-1023934.

For safety reasons, a PSA regeneration pressure is generally adopted just above atmospheric pressure, about 1.5 to 1.25 bar abs. It may be noted that in the other case, like the separation of the gases of air or the processing of $CO_2$ rich gases, a sub-atmospheric regeneration pressure can be used, the offgas compression machines accordingly comprising at least one vacuum pumping stage.

The offgas from the PSA $H_2$ units is generally used by being reintroduced into a fuel gas network of the refinery producing the feed gas mixture. The fuel gas network is generally at a pressure between 3.5 and 8 bar abs, entailing the recompression of the offgas extracted from the PSA to this pressure.

For questions of reliability, the offgas is generally compressed in at least two compressors in parallel, each processing 50% of the offgas flow in nominal operation.

In case of temporary shutdown or maintenance of one of the compressors, the operation of the unit must be adjusted to take account of the performance of the remaining compressor.

One conventional solution is to reduce the flow of feed gas and of the production gases of the PSA unit by 50%.

It has been proposed, as a variant, to use two compressors, each capable of compressing about 65% of the nominal offgas flow. In normal operation, at least one of the compressors is used at reduced capacity and, in case of shutdown of one of the compressors, the remaining compressor can then provide about ⅔ of nominal production.

However, these two known solutions are relatively costly in terms of production loss and/or investment costs.

It is the object of the present invention to improve the production capacity of such PSA units when one of the offgas (second stream) compression means is shut down, without significantly increasing the investment costs.

One solution according to the present invention is accordingly a method for separating by adsorption, in a PSA unit with one or more adsorbers, operating in pressure cycles with given operating parameters, at least one feed gas mixture at a first pressure $P_1$ with production of at least a first gas mixture stream at a second pressure $P_2$ lower than $P_1$, and at least one second gas mixture stream at a third pressure $P_3$ lower than $P_2$, comprising the step of compressing the second stream in at least two compressors in parallel to a fourth pressure $P_4$ higher than $P_3$, characterized in that in case of temporary shutdown of one of the compressors of the second stream, at least one of the said operating parameters of the PSA unit is changed to increase the pressure of the second stream at the outlet of the PSA unit to a fifth pressure $P_5$ higher than $P_3$.

The method of the invention accordingly serves to provide a production rate relatively close to the nominal, significantly higher than 50%, typically higher than 75%, in exchange for just a small extra investment compared with the least costly solution, that is, with two compressors having a capacity of 50% of the flow of the second stream.

Depending on each case, the method of the present invention may further comprise one or more of the following features:

- in the modified operating mode, the flow of feed gas mixture is reduced by less than 50%, typically by less than 20%, and the flow of the first stream is reduced by less than 20%. In other words, the flow of the feed gas mixture always remains equal to or higher than 50% of the nominal flow, preferably equal to or higher than 80%;
- in the modified operating mode, the flow of the first stream is reduced by less than 25%, that is, the flow of the first stream always remains equal to or higher than 75% of the nominal production rate;
- the modified operating mode is preprogrammed in the monitoring and control system of the PSA unit;
- the feed gas mixture contains at least three components selected from $H_2$, $CO$, $N_2$, $CO_2$ and $CH_4$, the second outgoing stream being a hydrogen-lean mixture;
- the feed gas mixture is rich hydrogen, the first outgoing stream being substantially pure hydrogen, and the second outgoing stream is a combustible offgas injectable into a fuel gas network;
- the feed gas mixture contains $CO_2$, the second outgoing stream being rich in $CO_2$;
- the feed gas mixture is air, the first outgoing stream being rich in oxygen and the second outgoing stream being an oxygen-lean mixture;
- the operating parameters of the PSA unit are selected from the flow rate of the feed gas mixture, the number of pressure balancing stops carried out during each pressure cycle, the pressure levels of each pressure balancing, and the duration of the pressure cycle and/or of the elementary steps of the said cycle;
- the flow rate of the feed gas mixture is between 500 and $200 \times 10^3$ $Sm^3/h$;
- the number of pressure balancing stops is lower than or equal to 5, preferably lower than or equal to 4;
- the duration of a pressure cycle is between 1 and 30 minutes, preferably shorter than or equal to 15 minutes;
- the PSA unit comprises 2 to 20 adsorbers, preferably between 3 and 12 adsorbers;
- each adsorber contains at least one bed of adsorbent material, particularly activated alumina and/or silica gel and/or activated carbon and/or zeolite, whether exchanged or not.

In the context of the invention, the number of pressure balancing stops corresponds by definition to the number of adsorbers with which the adsorber in depressurization is successively communicated. Thus an integral number of balancing stops is defined, ranging from 0 (cycle without balancing)

to a maximum of generally 5. Cycles with 1, 2, 3 or 4 balancing stops are widely described in the literature.

A balancing is said to be complete if two adsorbers A1 and A2 initially at pressures respectively equal to P1 and P2 are communicated until the common equilibrium pressure P3 is obtained, no other gas stream being introduced into or withdrawn from the system during this step.

If the adsorber A1 reaches a pressure P4>P3 at the end of balancing and/or if the adsorber A2 is repressurized to a pressure P5<P3, the balancing is said to be incomplete.

A balancing may therefore be incomplete if the communication between adsorbers is stopped before reaching equilibrium (P4>P3 and P5<P3), if another stream is simultaneously injected or withdrawn. This is, for example, the case if the adsorber A1 and by a stream issuing from production (first mixture stream) or of the feed gas mixture.

It is said that in this case, the balancing or, by extension, the number of balancing stops, is reduced. By comparing the quantities of gas actually exchanged during the balancing with the maximum quantity of gas exchangeable in the case of complete balancing, a non-integral number of actual balancing stops can be defined, for example 0.8 or 2.7.

To modify a PSA cycle, one can therefore either reduce balancing, for example, by going from 3.0 to 2.5 by stopping the final balancing in mid-course, or by eliminating a balancing step, for example, by going from 3 to 2 balancing stops. In any case, the pressure levels are modified at the end of the balancing steps.

Another important step is the generation of the elution gas, which scavenges and regenerates the adsorbent present at the low pressure of the cycle. This quantity of gas is supplied by a supplementary depressurization of the adsorber. It is therefore characterized by the initial and final pressure levels of the said step. Specialized works provide details about the optimal quantity of elution gas.

It may be observed that since the pressure at the end of a step is the pressure of the beginning of the next step, and since the adsorbers are generally connected during gas exchanges, modifying a pressure is equivalent to more generally modifying the entire pressure cycle.

In general, a PSA cycle is defined by the pressure variations that it undergoes over time. Since the process is cyclic, the pressure conditions at the end of the last step are identical to the initial conditions. The cycle time is the time required for an adsorber to return to its initial state. The cycle of a PSA is generally broken down into phase times (normally equal to the number of adsorbers), with each phase in turn possibly consisting of steps or sub-steps.

The elementary steps are well known to a person skilled in the art: adsorption, concurrent or countercurrent depressurization, elution gas generation, elution (purge), concurrent or countercurrent repressurization etc., by way of example and in a non-limiting manner.

Hence the operation of a PSA is defined on the one hand by its pressure cycle (type of step, duration, pressure) and, on the other, by the composition, flow rate and temperature of the feed mixture.

All these parameters generally constitute the operating conditions of the adsorption unit.

Other features and advantages of the invention will appear from the following description of embodiments, provided for illustration but non-limiting, with reference to the single FIGURE appended hereto, illustrating a PSA installation for the implementation of the method of the invention.

The single FIGURE shows a PSA separation unit S receiving at least one feed gas mixture to be separated 1 and producing, at the outlet, at least one first stream or main production stream 2 and at least one second stream or "offgas" stream 3.

The PSA separation unit comprises several adsorbers which are used cyclically and each comprise at least one adsorbent material capable of retaining and restoring at least one of the components of the feed gas mixture 1.

For the use of the second "offgas" stream 3, the pressure of this stream, at the outlet of the unit S, is increased by at least two compressors in parallel $C_1$, $C_2$ to supply, typically, a line of a fuel gas network 4.

In nominal operation, the flow A of the feed gas mixture 1 is 100%, the flow B of the first outgoing "production" stream 2 also being 100%, while the flow of the second stream 3 is 50% for each of the compressors $C_1$, $C_2$ which compresses combustible fluid flowing in the line 4 from the pressure P3 to the pressure $P_4$. These are, by definition, the nominal flows of the installation.

In the rest of the description, reference is made to the particular case, non-limiting for the application of the method of the invention, of a hydrogen production installation with a unit S typically comprising 6 adsorbers to process a flow A of 100% feed gas 1 of 10 000 $Sm^3/h$ containing 70 mol % hydrogen and hydrocarbons, essentially methane.

The pressure $P_1$ and the temperature of the feed gas mixture 1 entering the unit are typically 30 bar abs and 35° C. respectively. The pressure $P_2$ of the hydrogen stream 2 is slightly lower than $P_1$.

To obtain a high yield, each adsorber of the unit S is subjected to three successive pressure balancing stops up to a low offgas discharge pressure 3 of about 1.25 bar abs.

With such an installation, an effective extraction yield of hydrogen exceeding 88% can be obtained for a purity above 99.99%, or, with the 100% feed flow A of 10 000 $Sm^3/h$, a 100% flow B of the hydrogen stream 2 of 6160 $Sm^3/h$ and an offgas flow rate 3 of 3840 $Sm^3/h$, the latter being raised to the pressure $P_4$ in the line 4 by the compressors $C_1$, $C_2$, each compressing 1920 $Sm^3/h$ of gas.

In conventional methods, in case of unavailability of one of the two compressors $C_1$, $C_2$, the operating parameters are changed to process a flow A equal to 50% of the feed gas 1 with the same pressure cycle, but with a doubled phase time because of the reduced feed, to produce an outgoing flow B equal to 50% of the stream 2, or 3080 $Sm^3/h$ of hydrogen. The 1920 $Sm^3/h$ of offgas are compressed by the machine remaining in service.

According to the invention, in contrast, the operating parameters of the PSA unit are changed to increase the regeneration pressure, to a value $P_5$ that is higher than the nominal pressure $P_3$, in order to increase the molar flow which can be compressed by the compressor Ci remaining in service. By increasing the regeneration pressure, the potential performance of the PSA in terms of yield and capacity is certainly decreased, but operating points exist such that the product of the feed gas flow which can be processed in these conditions by the reduced yield of the modified operating conditions is higher than the 50% of nominal production obtained by the conventional method mentioned above.

By starting with the conventional solution, which consists in processing 50% of the flow, reducing the phase time (which has just been doubled due to the reduced feed rate as indicated above), increases the purity of the hydrogen produced with a drop in hydrogen production and an increase in offgas production, for example from 1920 to 2110 $Sm^3/h$. To remove this excess offgas 2, the compressor $C_i$ remaining in service, of which the volumetric flow rate is constant, has its suction pressure increased from 1.25 to 1.375 bar abs. Moreover, since the purity of the hydrogen produced is increased above the specification, the flow A of the feed gas mixture 1 can be increased. This results in an increase in production and also in offgas, the latter, as mentioned above, leading to an increase in the suction pressure of the compressor. One can then, for example, return to the nominal cycle time, thereby again increasing the feed rate while maintaining the requisite purity.

It is appropriate simultaneously to modify the pressure cycle, as stated in the example below, to derive the maximum benefit therefrom.

One can thus produce, according to the invention, over 75% of the nominal flow B % of hydrogen with a single compressor $C_i$ operating between 2.5 bar abs at the suction and 6.5 bar abs at the discharge, by simply providing a slightly oversize (by about 15%) compressor drive motor, and also coolers adapted to the maximum power dissipation.

Thus the gas flow to be processed is reduced while keeping it above 50%, and, if necessary, the phase time is adjusted to obtain the requisite purity of the hydrogen produced. The offgas flow of the PSA unit higher than 50% of the flow corresponding to nominal operation is removed by the compressor remaining in service, thanks to a higher suction pressure than the nominal pressure.

Thus, from the basic design of the unit, an operating point can be determined in operation with "a single compressor in service", the only requirements set being the volume of the adsorbers and the actual flow of the compressor. This operating point is determined in the same way (that is, using the same theoretical or experimental tools) as the PSA H2 is dimensioned in the nominal case.

In the case of the above example, by preserving the nominal phase time, an operating point is found in "modified" conditions, for producing 5290 $Sm^3/h$ of hydrogen—or about 85% of the nominal B %—with a feed gas mixture flow of 9000 $Sm^3/h$ (hence 90% of the nominal flow A %) for an offgas flow of 3710 $Sm^3/h$ removed by the compressor in service Ci under a section pressure of 2.4 bar abs. To do this, the pressure of the final balancing in the adsorbers has been increased from about 8 bar abs to 10 bar abs, which is equivalent to decreasing the number of balancing stops according to the definitions given above.

The modified cycle thus selected can be pre-programmed in the control system of the PSA unit, as taught in document WO-A-2004/000441.

This second cycle can be similar to the basic cycle if it is acceptable to perform a final incomplete balancing, that is, to stop the balancing in progress as indicated above or, on the contrary, this second cycle can be substantially different from the basic cycle with, for example, the complete elimination of 1 (or more) balancing step(s), such as a reduction from 3 to 2 balancing stops. The choice of the second cycle generally raises no particular problem, considering the large number of alternatives available to a person skilled in the art, which can be found in the literature.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method for separating by adsorption, in a PSA unit with one or more adsorbers, operating in pressure cycles with given operating parameters, at least one feed gas mixture at a first pressure $P_1$ with production of at least a first gas mixture stream at a second pressure $P_2$ lower than $P_1$, and at least one second gas mixture stream at a third pressure $P_3$ lower than $P_2$, comprising the step of compressing the second stream in at least two compressors in parallel to a fourth pressure $P_4$ higher than $P_3$, wherein the step of compressing is carried out in a modified mode at a temporary shutdown of one of the compressors of the second stream, and at least one of the said operating parameters of the PSA unit is changed to increase the pressure of the second stream at the outlet of the PSA unit to a fifth pressure $P_5$ higher than $P_3$ during the modified mode.

2. The method of claim 1, wherein, in the modified operating mode, the flow of feed gas mixture is reduced by less than about 50%.

3. The method of claim 1, wherein, in the modified operating mode, the flow of the first stream is reduced by less than about 25%.

4. The method of claim 1, wherein the modified operating mode is preprogrammed in the monitoring and control system of the PSA unit.

5. The method of claim 1, wherein the feed gas mixture contains at least three components selected from $H_2$, CO, $N_2$, $CO_2$ and $CH_4$, the second stream being a hydrogen-lean mixture.

6. The method of claim 1, wherein the feed gas mixture is rich in hydrogen, the first stream is production hydrogen, and the second stream is a combustible offgas injectable into a fuel gas network.

7. The method of claim 1, wherein the feed gas mixture contains $CO_2$, the second stream being rich in $CO_2$.

8. The method of claim 1, wherein the feed gas mixture is air, the first stream is rich in oxygen and the second stream is an oxygen-lean mixture.

9. The method of claim 1, wherein the operating parameters of the PSA unit are selected from: a) the flow rate of the feed gas mixture, b) a number of pressure balancing stops carried out during each pressure cycle, c) the pressure levels of each pressure balancing, d) the pressure levels of the step or steps supplying an elution gas, and e) the duration of each pressure cycle and/or the duration of the steps making up the pressure cycle.

10. The method of claim 1, wherein:
a) the flow rate of the feed gas mixture is between about 500 and about $200 \times 10^3$ $Sm^3/h$, b) a number of pressure balancing stops which is lower than or equal to 5, c) the duration of a pressure cycle is between about 1 and about 30 minutes, and d) the PSA unit comprises about 2 to about 20 adsorbers.

* * * * *

UNITED STATES PATENT AND TRADEMARK OFFICE
CERTIFICATE OF CORRECTION

PATENT NO. : 7,648,562 B2  Page 1 of 1
APPLICATION NO. : 11/501134
DATED : January 19, 2010
INVENTOR(S) : Monereau et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 749 days.

Signed and Sealed this

Twenty-eighth Day of December, 2010

David J. Kappos
*Director of the United States Patent and Trademark Office*